(12) United States Patent
Yamanaka et al.

(10) Patent No.: US 7,152,501 B2
(45) Date of Patent: Dec. 26, 2006

(54) BICYCLE CRANK FIXING STRUCTURE

(75) Inventors: Masahiro Yamanaka, Izumisano (JP); Fujihisa Tatsumi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/092,616

(22) Filed: Mar. 30, 2005

(65) Prior Publication Data
US 2006/0117905 A1 Jun. 8, 2006

(30) Foreign Application Priority Data
Nov. 29, 2004 (JP) ............................. 2004-343936

(51) Int. Cl.
G05G 1/14 (2006.01)
(52) U.S. Cl. .................................................. 74/594.1
(58) Field of Classification Search ............... 74/594.1, 74/594.2, 594.3, 551.1; 403/234–235, 338, 403/398
See application file for complete search history.

(56) References Cited

U.S. PATENT DOCUMENTS

| | | | | |
|---|---|---|---|---|
| 4,019,230 A | * | 4/1977 | Pollard | ........................ 280/214 |
| 6,581,462 B1 | * | 6/2003 | Marmonier | ................. 73/432.1 |
| 6,581,492 B1 | * | 6/2003 | Chen | .......................... 74/551.3 |
| 6,845,687 B1 | * | 1/2005 | Yamanaka | .................. 74/594.1 |
| 2004/0162172 A1 | | 8/2004 | Yamanka et al. | |

FOREIGN PATENT DOCUMENTS

JP 2004-249770 A 9/2004

* cited by examiner

*Primary Examiner*—Richard Ridley
*Assistant Examiner*—James Pilkington
(74) *Attorney, Agent, or Firm*—Global IP Counselors, LLP (57) ABSTRACT

A bicycle crank fixing structure is arranged to fix a left crank with a mounting bore and a slit extending radially from the mounting bore to a crank axle. The mounting bore is non-rotatably coupled to the crank axle. The slit is provided with two mounting bolts that perpendicularly intersect to adjust a width of the slit to fasten the crank to the crank axle. The crank axle has a retaining hole formed on the outer circumferential surface thereof which faces the slit of the crank. A retaining member with a retaining projection is disposed in the slit such that the retaining member rotates by rotation of the mounting bolt. The retaining projection of the retaining member is retained in the retaining hole formed on the crank axle to prevent the crank from detaching from the crank axle even when a fastening bolt is loosened.

17 Claims, 7 Drawing Sheets

BICYCLE CRANK FIXING STRUCTURE

CROSS-REFERENCE TO RELATED APPLICATIONS

This application claims priority to Japanese Patent Application No. 2004-343936. The entire disclosure of Japanese Patent Application No. 2004-343936 is hereby incorporated herein by reference.

BACKGROUND OF THE INVENTION

1. Field of the Invention

The present invention relates to a bicycle crank fixing structure that fixes a crank to a crank axle. More specifically, the present invention relates to a bicycle crank fixing structure in which a crank having a mounting hole and a slit extending radially from the mounting hole toward a free end of the crank is fixedly coupled to the crank axle by coupling the crank axle to the mounting hole of the crank.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle crank axle assembly.

A bicycle crank axle assembly, which is often called a bottom bracket, is usually mounted on a hanger part of a bicycle. A conventional crank axle assembly includes the first and second axle supporting members screwed on both axial ends of the hanger part separately. The first and second axle supporting members include first and second bearing retaining sections, respectively so that first and second bearings are disposed on the first and second bearing retaining sections of the first and second axle supporting members, and a crank axle is supported on the first and second bearings. Two (right and left) cranks are non-rotatably mounted on the axial end portions of the crank axle.

One example of a conventional crank axle assembly is disclosed in Japanese Laid-Open Patent Publication No. 2004-249770 which has a right gear crank is secured on the right axial end of the crank axle. A left crank includes a mounting hole where the crank axle passes through and a slit that extends radially from the mounting hole in a crank axle mounting part of the left crank. The left crank is fastened on the crank axle by tightening up the slit by two screw members disposed to perpendicularly intersect with the slit, and by a fastening bolt screwed to the inner circumference surface of the left axial end of the crank axle. The screw members are arranged to tightly secure the left crank. These two screw members are inserted from different directions from each other to reduce the increase of thickness of the crank axle mounting part in the axial direction by preventing the interference between head portions of the screw members. In addition, the inner rings of the first and second bearings are pressed by the inner edge parts of the right and left cranks and disposed so as to enable them to be pressed by the right and left cranks.

In such conventional crank axle assembly as described above, when the crank is mounted on the crank axle by the fastening bolt, the right and left cranks contact the outside surface of the inner rings of the first and second bearings, respectively, and press the inner rings inwardly. Thus, misalignment of the first and second bearings can be eliminated by adjusting the bearing play with adjustment of the pressure imparted from the left and right cranks. After the bearing play is adjusted, the screw members are fastened to completely fixedly couple the crank to the crank axle.

Since the left crank is fixed on the crank axle by the fastening bolt and the screw members in the conventional crank axle assembly, changes in the bearing play or misalignment of the crank axle assembly will not occur unless the fastening bolt and the screw members are all loosened. However, if the fastening bolt is dropped off in a state in which the screw members are loose, there is a possibility that the left crank is detached from the crank axle. If the left crank is fixed by only the screw members without using the fastening bolt, the left crank may be detached by only loosening the screw members.

In view of the above, it will be apparent to those skilled in the art from this disclosure that there exists a need for an improved bicycle crank fixing structure. This invention addresses this need in the art as well as other needs, which will become apparent to those skilled in the art from this disclosure.

SUMMARY OF THE INVENTION

One object of the present invention is to provide a bicycle crank fixing structure in which the crank is fastened by tightening the screw members provided in the slit of the crank such that the crank is prevented from being detached from the crank axle even when the screw members are loosened.

In order to achieve the above mentioned object and other objects of the present invention, a bicycle crank fixing structure is provided that basically comprises a crank axle, a crank, a first screw member and a plate-shaped retaining member. The crank axle has a first axial end with a recess section formed on an outer circumferential surface thereof. The crank includes a crank axle mounting section with a mounting bore non-rotatably coupled to the first axial end of the crank axle and a slit extending radially from the mounting bore. The crank is disposed with respect to the crank axle so that the slit of the crank is aligned with the recess section of the crank axle. The first screw member is disposed in the crank axle mounting section of the crank so that the first screw member perpendicularly intersects with the slit of the crank to fasten the crank on the crank axle by adjusting a width of the slit. The plate-shaped retaining member is disposed in the slit of the crank. The retaining member has a retaining projection that is retained in the recess section of the crank axle.

With the bicycle crank fixing structure of the present invention, when the crank is mounted to the crank axle, the screw member is loosely mounted in a state in which the retaining member is disposed in the slit of the crank. Next, the mounting bore of the crank is mounted on the axial end of the crank axle in a state in which the retaining member is placed so that the projection of the retaining member does not interfere with the crank axle. When the crank is mounted to the crank axle, the retaining member is rotated so that the projection of the retaining member engages in the recess section of the crank axle to prevent the crank from detaching from the crank axle. Then, the width of the slit is narrowed by tightening the screw member thereby fixedly coupling the crank on the crank axle by strongly pressing the mounting bore on the crank axle, and the retaining member is fixed. Since the retaining member is disposed in the slit of the crank, and the projection of the retaining member is locked in the recess section formed in the crank axle, the crank will not drop off from the crank axle even if the screw member is loosened.

With the bicycle crank fixing structure in accordance with a second aspect of the present invention, the bicycle crank fixing structure in accordance with first aspect further comprises a fastening bolt screwed to a female screw section formed on the first axial end of the crank axle to fixedly couple the crank to the crank axle.

Accordingly, the crank is unlikely to drop off even if the screw member is loosened since the crank will not drop off unless the fastening bolt is loosened.

With the bicycle crank fixing structure in accordance with a third aspect of the present invention, the bicycle crank fixing structure in accordance with first aspect further comprises a second screw member disposed in the crank axle mounting section of the crank so that the second screw member perpendicularly intersects with the slit of the crank. The second screw member is spaced apart from the first screw member in an axial direction of the crank axle. Accordingly, by setting up the projection between the engagement notch and the mounting hole, the rotation radius of the projection becomes smaller, and the projection can be engaged with the recess section with a small projecting amount.

With the bicycle crank fixing structure in accordance with a fourth aspect of the present invention, the bicycle crank fixing structure in accordance with first aspect is configured such that the first and second screw members include first and second head portions, respectively, that are disposed in opposite sides with respect to the slit of the crank. Accordingly, when the second screw member is turned in a state in which the rotating cam surface of the retaining member is engaged with the screw groove of the second screw member, the retaining member rotates by a friction of the rotating cam surface and the screw groove by rotation, and the projection of the retaining member is retained in the recess section of the crank axle. Since the retaining member can be rotated by rotating the second screw member, positioning of the retaining member is simple.

With the bicycle crank fixing structure in accordance with a fifth aspect of the present invention, the bicycle crank fixing structure in accordance with first aspect is configured such that the retaining member is arranged such that the mounting hole is disposed inwardly with respect to the engagement notch in the axial direction of the crank axle. In this case, tightening of the second screw member and rotation of the retaining member can be simultaneously performed with consideration made to the direction of the screw of the second screw member and positions of the head portion of the second screw member.

With the bicycle crank fixing structure in accordance with a sixth aspect of the present invention, the bicycle crank fixing structure in accordance with first aspect is configured such that the retaining member is made of metal Therefore, since the retaining member is arranged as a metallic member, the durability of the retaining member is improved, and maintenance of the crank is easy.

With the bicycle crank fixing structure in accordance with a seventh aspect of the present invention, the bicycle crank fixing structure in accordance with first aspect is configured such that the retaining member is made of resin. Therefore, since the retaining member is arranged as a resin member, weight saving can be facilitated with low price, and the retaining member can be fixed in a retaining position by using resilient characteristic of resin material.

Accordingly, with the present invention, since the retaining member is placed in the slit of the crank and the projection of the retaining member is retained in the recess section of the crank axle, the crank will not be dropped off from the crank axle even if the screw member is loosened.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
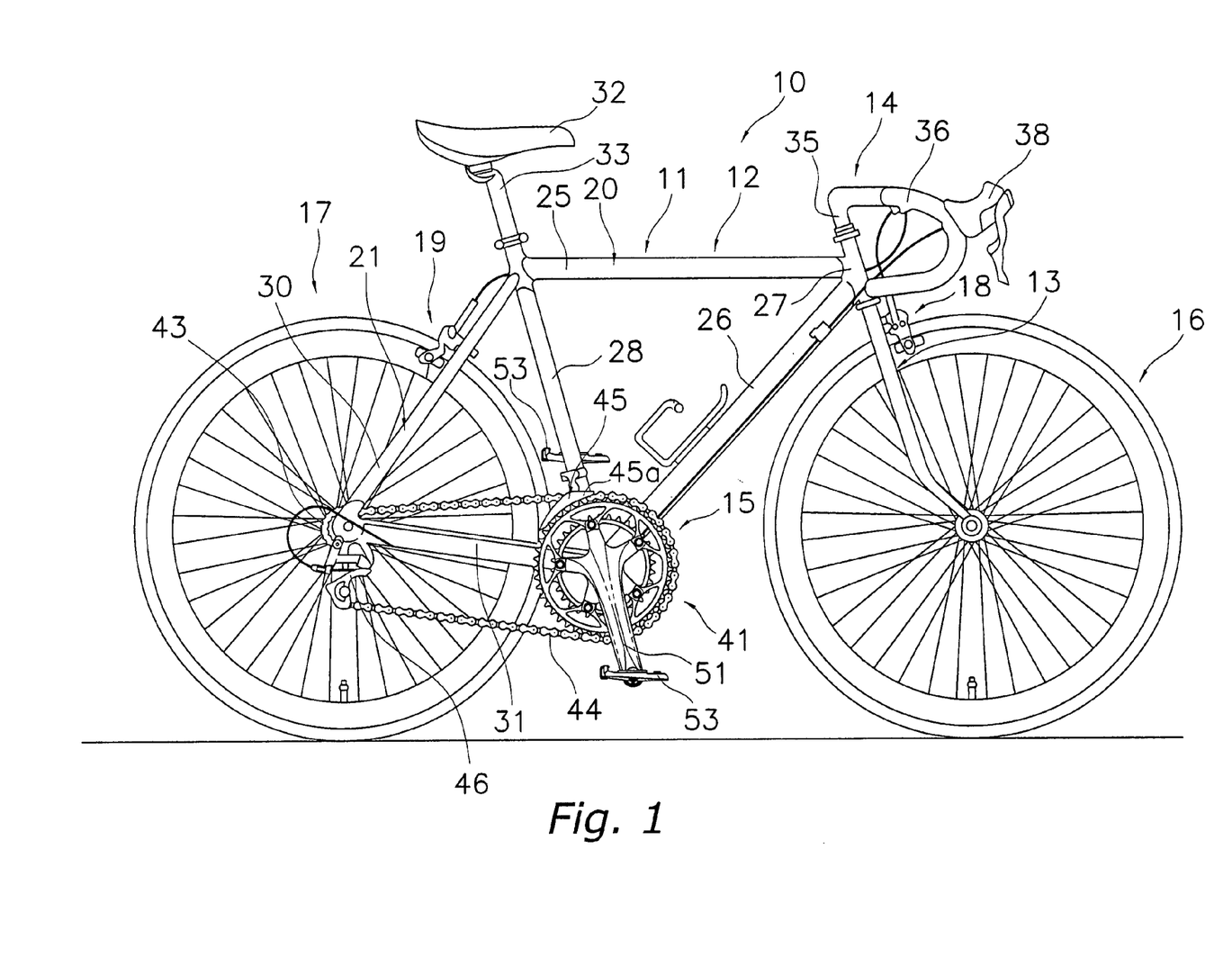
FIG. 1 is an overall side elevational view of a bicycle with a bicycle crank fixing structure in accordance with a first embodiment of the present invention.

Referring initially to FIG. 1, a bicycle 10 is illustrated in accordance with a preferred embodiment of the present invention. As shown in FIG. 1, the bicycle 10 is arranged as, for example, a road bike with a drop-type handlebar part 14. The bicycle 10 includes a diamond-shaped frame 11 forming a skeleton of a bicycle. The frame 11 includes a frame body 12 and a front fork 13 that is rotatably supported at the front part of the frame body 12 with respect to a slanted vertical axis. The front fork 13 has its bottom part divided into two. In addition, the bicycle 10 includes the handlebar part 14 that is linked to the front fork 13, a drive member 15 that converts the stepping force into driving force, a front wheel 16 that is rotatably supported on the bottom end of the front fork 13, a rear wheel 17 that is rotatably supported on the rear part of the frame body 12 and front and rear braking devices 18 and 19.

As seen in FIG. 1, the frame body 12 includes a front triangle 20 and a rear triangle 21 that is placed on the back of the front triangle 20. The front triangle 20 consists of a top pipe 25 that is placed in the lateral direction, a bottom pipe 26 that is placed upward on the bottom of the top pipe 25, a head pipe 27 that connects front edges of the top pipe 25 and the bottom pipe 26 and a stand pipe 28 that extends obliquely upward. A seat post 33 to which a saddle 32 is fixed is disposed on the stand pipe 28 so that the vertical position thereof can be adjusted. A tubular hanger part 29 (shown in FIG. 2) is formed at a connection part of the stand pipe 28 and the bottom pipe 26. The rear triangle 21 consists of a seat stay 30 that has its front edge connected to the stand pipe 28 and extends obliquely downward by being divided into two and a chain stay 31 that is divided into two from the bottom edge of the stand pipe 28 and is connected on the back edge of the seat stay 30.

A handle stem 35 that constitutes part of the handlebar part 14 is fixed on the top of the front fork 13 in a vertically movable manner. A handlebar 36 that has both free ends extending horizontally with curved portions is fixed on the top edge of handle stem 35. A brake lever 38 with a gear shifting function is mounted on both ends of handlebar 36.

The drive member 15 includes a crank part 41 that is coupled to the hanger part 29, a small gear part 43 that is non-rotatably mounted on a free hub of the rear wheel 17, a chain 44 that extends between the crank part 41 and the small gear part 43 and a front derailleur 45 and a rear derailleur 46 for shifting gears. The front derailleur 45 has a chain guide 45a where the chain 44 is inserted.

Figure 2:
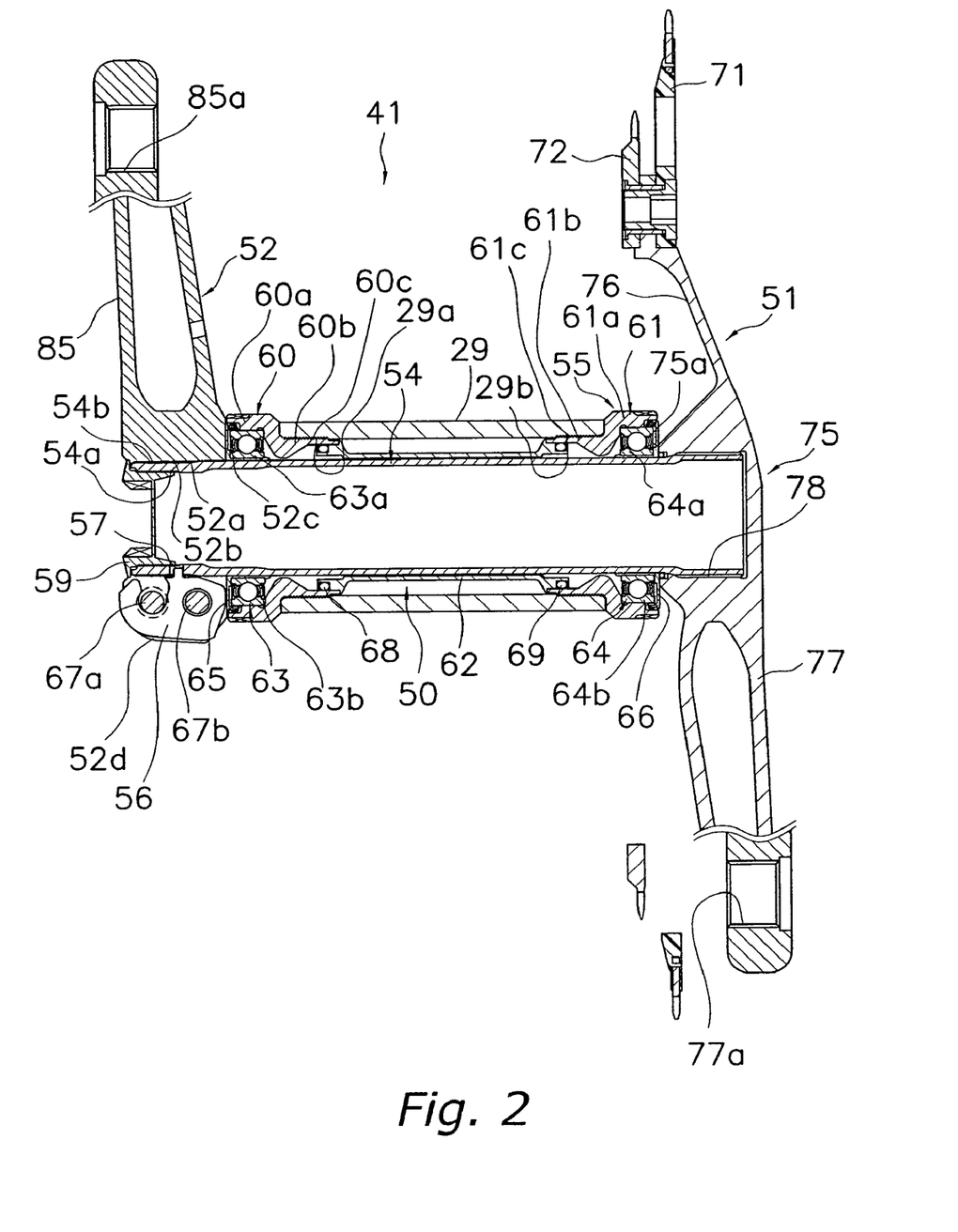
FIG. 2 is a transverse cross sectional view a crank axle assembly with the bicycle crank fixing structure in accordance with the first embodiment of the present invention.

As shown in FIG. 2, the crank part 41 includes a crank axle assembly 50 that has a crank axle 54 rotatably supported on the hanger part 29 of the frame 11, a right crank 51 that is crimp-fastened on the right end portion of the crank axle 54 and a left crank 52 that is fastened on the left end portion of the crank axle 54 with a crank fixing structure 56 for preventing the left crank 52 from detaching from the crank axle 54. A pedal 53 (FIG. 1) is coupled to each of the free ends of the right and left cranks 52 and 53.

More specifically, the crank axle assembly 50 comprises the crank axle 54 and a bottom bracket 55 that is mounted on the hanger part 29 to rotatably support the crank axle 54.

Figure 3:
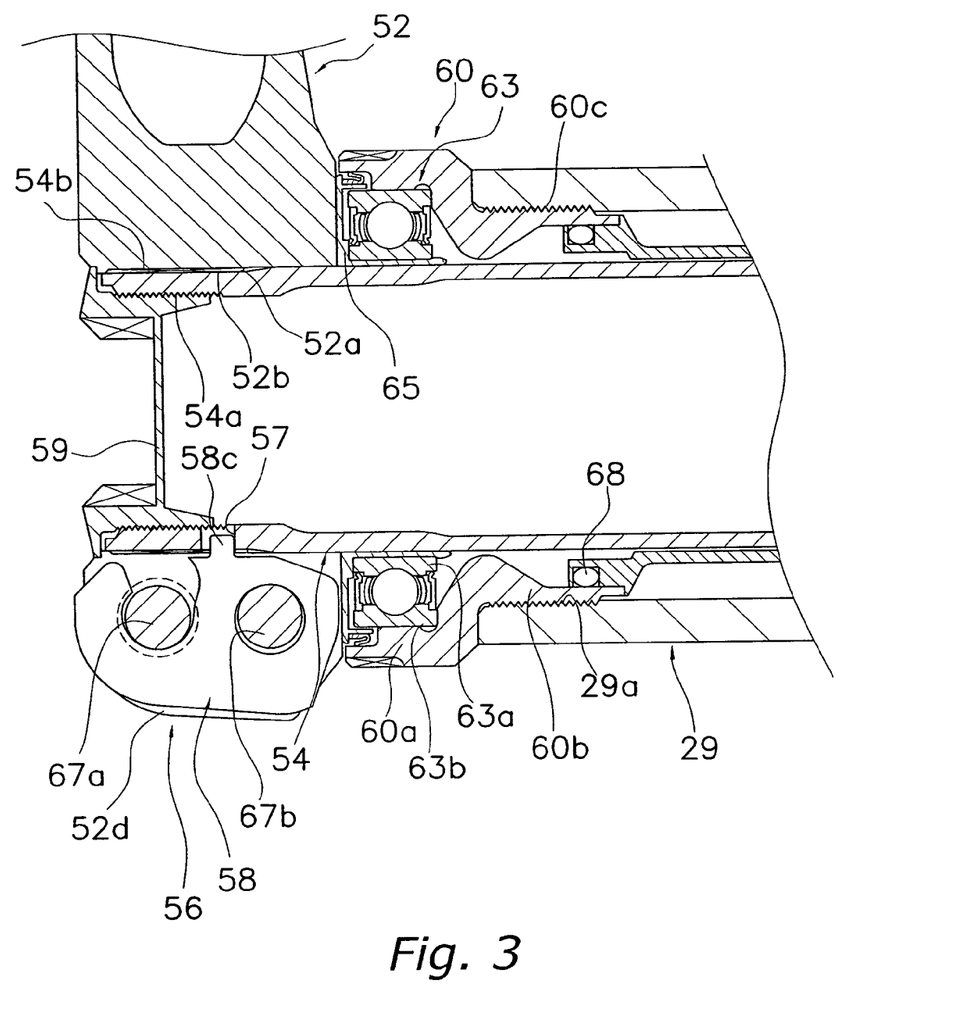
FIG. 3 is an enlarged partial cross sectional view of an axial end portion of the crank axle assembly in accordance with the first embodiment of the present invention.

The crank axle 54 is preferably an alloy hollow pipe-shaped member that is highly rigid such as chrome molybdenum steel. The crank axle 54 includes a female screw part 54a on an inner circumferential surface of the left end portion thereof so that a fastening bolt 59 is screwed into the female screw part 54a to fasten the left crank 52. In addition, as shown in FIG. 3, a serration 54b is provided on the outer circumferential surface of the left end portion of the crank axle 54 to non-rotatably link the left crank 52 thereon. Moreover, a retaining hole 57 (recess section) is provided in the serration 54b of the crank axle 54 that constitutes part of the crank fixing structure 56. The retaining hole 57 extends between inner and outer surfaces of the crank axle 54 as seen in FIG. 3. The retaining hole 57 is configured and arranged to retain a plate-shaped retaining member 58 as described in more detail below.

The bottom bracket 55 includes right and left bearing housings 60 and 61 that are screwed in from both ends of the hangar part 29, a tube-shaped connecting member 62 that concentrically links the right and left bearing housings 60 and 61, right and left bearings 63 and 64 that are mounted on the right and left bearing housings 60 and 61 and right and left cover members 65 and 66 that are mounted between the crank axle 54 and inner rings of right and left bearings 63 and 64.

The right and left bearing housings 60 and 61 are shoulder tube-shaped members and include bearing retaining sections 60a and 61a, respectively, in which the bearings 63 and 64 are retained stored separately. The right and left bearing housings 60 and 61 further include right and left mounting sections 60b and 61b, respectively, that are placed in alignment with the bearing retaining sections 60a and 61a, respectively, and non-rotatably mounted on the axial end portions of the hanger part 29. The bearing retaining sections 60a and 61a are disposed axially outwardly with respect to the mounting sections 60b and 61b and have a larger maximum diameter than the mounting sections 60b and 61b as seen in FIG. 2. The hanger part 29 includes the female screw parts 29a and 29b on the inner circumference on its both right and left edges, and the mounting sections 60b and 61b include male screw parts 60c and 61c that are placed axially inwardly with respect to the bearing retaining sections 60a and 61a so that the male screw parts 60c and 61c of the mounting sections 60b and 61b are screwed with the female screw parts 29a and 29b, respectively. In order to prevent the screws from becoming loose by rotation of the cranks, the left female screw part 29a is preferably a right screw, and the right female screw part 29b is preferably a left screw. Therefore, the male screw part 60c that screws on the left female screw part 29a is preferably a right screw, and the male screw part 61c is preferably a left screw.

The connecting part 62 is a tubular member that has an inside diameter that the crank axle 54 can penetrate therethrough. The connecting part 62 is coupled to inner edges of the mounting sections 60b and 61b of the right and left bearing housings 60 and 61 at axial ends thereof. Two O rings 68 and 69 are preferably mounted on connecting parts of the connecting member 62 and the bearing housings 60 and 61, respectively as seen in FIG. 2.

The bearings 63 and 64 are preferably roller bearings that include the inner rings 63a and 64a and outer rings 63b and 64b such as ball bearings. The bearings 63 and 64 are disposed so that movements of the inner rings 63a and 64a toward outside in the axial direction (left for the bearing 63 in FIG. 2, and right for the bearing 64 in FIG. 2) is restricted by the right and left cranks 52 and 51 via the cover members 65 and 66 respectively, and movements of the outer rings 63b and 64b toward the inside in the axial direction (right for the bearing 63 in FIG. 2, and left for the bearing 64 in FIG. 2) is restricted by the bearing housings 60 and 61, respectively. The bearings 63 and 64 are preferably sealed bearings where seals are mounted between the inner rings 63a and 64a and the outer rings 63b and 64b, respectively, and grease is inserted in the bearings 63 and 64 in advance. Therefore, maintenance of the bearings 63 and 64 for lubrication can be omitted. Accordingly, with the arrangement of the crank axle assembly 50 as described above, the axis diameter of the crank axle 54 can be lengthened by placing the bearings 63 and 64 on the outside of the hanger part 29 in the axial direction. Therefore, the weight of the crank axle assembly 50 can be reduced by making the crank axle 54 hollow while the strength and rigidity of the crank axle 54 can be maintained at a high level.

The cover members 65 and 66 are, for example, hard resin members that cover the circumference surface on the bearing housings 60 and 61. The cover members 65 and 65 are disposed so that the cover members 65 and 66 are sandwiched by the right and left cranks 52 and 51 and the inner rings 63a and 64a of the bearings 63 and 64, respectively.

As seen in FIG. 2, the right crank 51 is a gear crank that is configured and arranged to be coupled to sprockets 71 and 72 and includes a crank connecting part 75, a plurality of arm parts 76, and a right crank arm part 77. The crank connecting part 75 has a mounting recessed part 78 that is formed with a tube-shaped space and non-rotatably mounted on the right edge of the crank axle 54. The arm parts 76 (five arm parts 76 are provided in this embodiment) can mount the two of large and small sprockets 71 and 72 on their free ends and radially extend from the crank connecting part 75. The right crank arm part 77 is fixedly coupled on the right edge of the crank axle 54 and a pedal mounting hole 77a is formed on its free end. An inner edge surface 75a in the axial direction of the connecting part 75 of the right crank 51 is disposed to press the inner ring 64a of the bearing 64 via the cover member 66.

Figure 4:
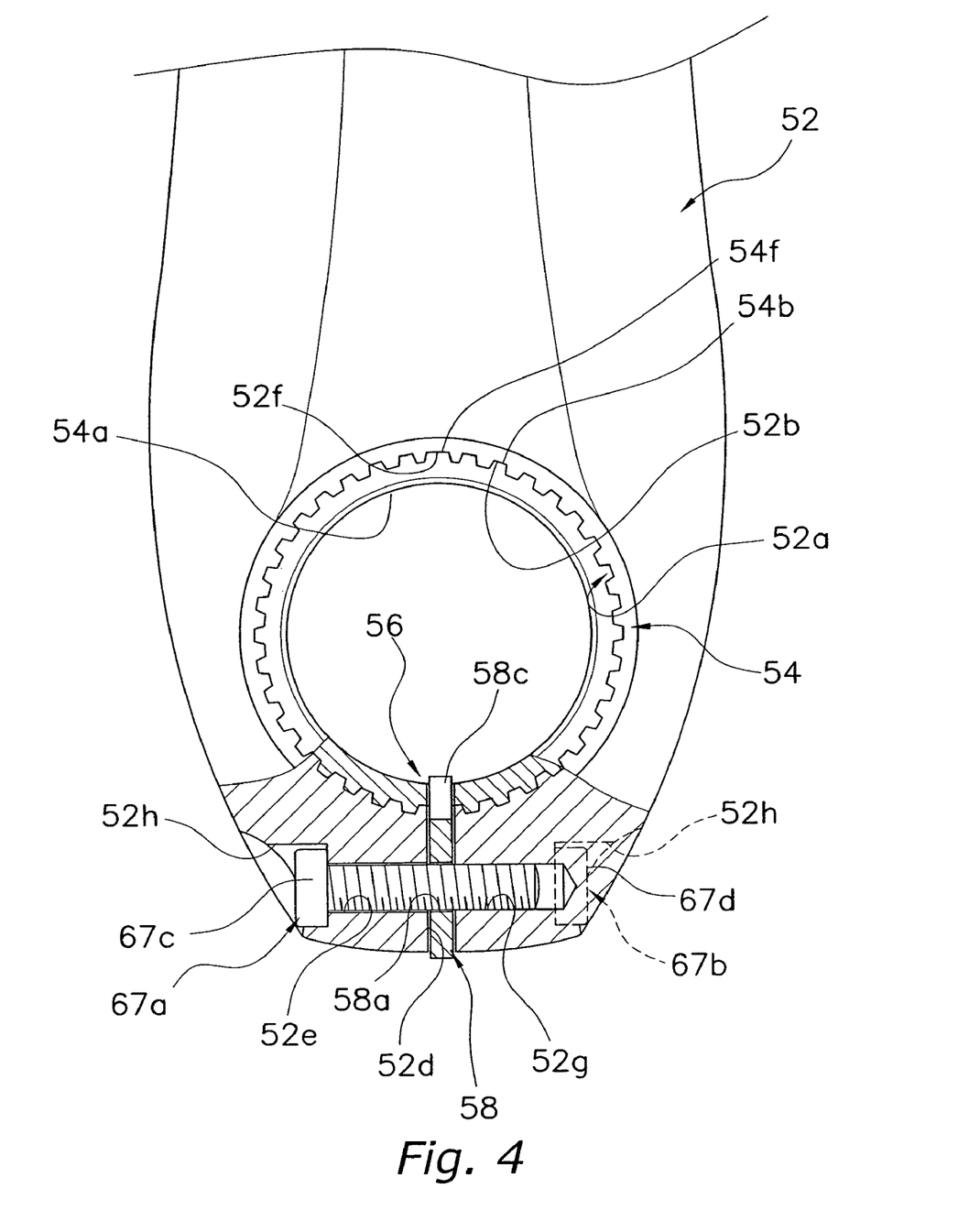
FIG. 4 is an enlarged partial cross sectional view of a crank axle mounting section of a left crank when a fastening bolt is taken off in accordance with the first embodiment of the present invention.

As shown in FIG. 2, the left crank 52 includes a hollow crank arm part 85 with a pedal mounting hole 85a to which that pedal 53 is screwed is formed on one end thereof. Moreover, the left crank 52 includes the mounting bore 52a and a slit 52d in a crank axle mounting section. The mounting bore 52a is non-rotatably mounted to the crank axle 54. The slit 52d radially extends radially from the inner circumference surface of the mounting bore 52a toward a free end of the left crank 52. A serration 52b that engages with the serration 54b to non-rotatably couple the left crank 52 to the crank axle 54 at a prescribed rotational phase is formed on the mounting bore 52a. The slit 52d is formed to extend toward the opposite direction of the pedal mounting hole 85a from the mounting bore 52a. The inner edge surface 52c of the left crank 52 can place pressure on the inner ring 63a of the bearing 63 through the cover member 65 in the axial direction. The left crank 52 is fixedly coupled to the crank axle 54 by a fastening bolt 59 that is screwed on the female screw part 54a of the crank axle 54 and can place pressure onto the bearings 63 and 64 with the right and left cranks 52 and 51 by screwing the fastening bolt 59. Therefore, the bearing play of the bearings 63 and 64 can be adjusted. A recess and protrusion parts 52f and 54f that are longer in the circumferential direction than other serrations is formed on the serrations 52b and 54b to place the right crank 51 and the left crank 52 with a rotational phase of 180 degrees apart as seen in FIG. 4. Therefore, both of the cranks 52 and 51 are placed with rotational phase of 180 degrees apart by locking the recess and protrusion parts 52f and 54f. In the first embodiment of the present invention, the recess and protrusion parts 52f and 54f are preferably placed on a line that extends from the rotational center of the crank axle 54 to the pedal mounting hole 85a.

In addition, two mounting bolts 67a and 67b (examples of the first and second screw members) for fastening the left crank 52 on the crank axle 54 by narrowing the width of the slit 52d are mounted on the crank axle mounting section on the bottom anchor. The mounting bolts 67a and 67b are spaced apart from each other in the axial direction of the crank axle 54 to perpendicularly intersect with the slit 52d. The two mounting bolts 67a and 67b are, for example, hexagonal socket head bolts, and head portions 67c and 67d of the mounting bolts 67a and 67b, respectively, are placed on the opposite sides with respect to the slit 52d. For example, in the first embodiment, the head portion 67c of the mounting bolt 67a (shown on the left in FIG. 3) is disposed on the left side as shown in FIG. 4 when viewed in a left side elevational view in a state in which the left crank 52 extends upwardly, and the head portion 67d of the mounting bolt 67b is placed on the right. In the left crank 52 where the slit 52d is formed, a pair of through-holes 52e though which the mounting bolts 67a and 67b passes and a pair of screw holes 52g to which the mounting bolts 67a and 67b are screwed are placed facing each other across the slit 52d and further placed in the opposite sides, spaced apart in the axial direction of the crank axle 54. Two head portion retaining recesses 52h that retain the head portions 67c and 67d are placed on the outside surface on the opposite sides with respect to the slit 52d, spaced apart in the axial direction of the crank axle 54.

The bicycle crank fixing structure 56 basically includes the two mounting bolts 67a and 67b that are described above, the fastening bolt 59 that is screwed onto the axial end of the crank axle 54, the retaining hole 57 that is formed on the crank axle 54 and the retaining member 58. The retaining hole 57 is formed by penetrating the inner and outer circumference surfaces at a position facing the slit 52d in the serration 54b of the crank axle 54. Both of the mounting bolts 67a and 67b are preferably arranged as standard right screws in the first embodiment.

Figure 5:
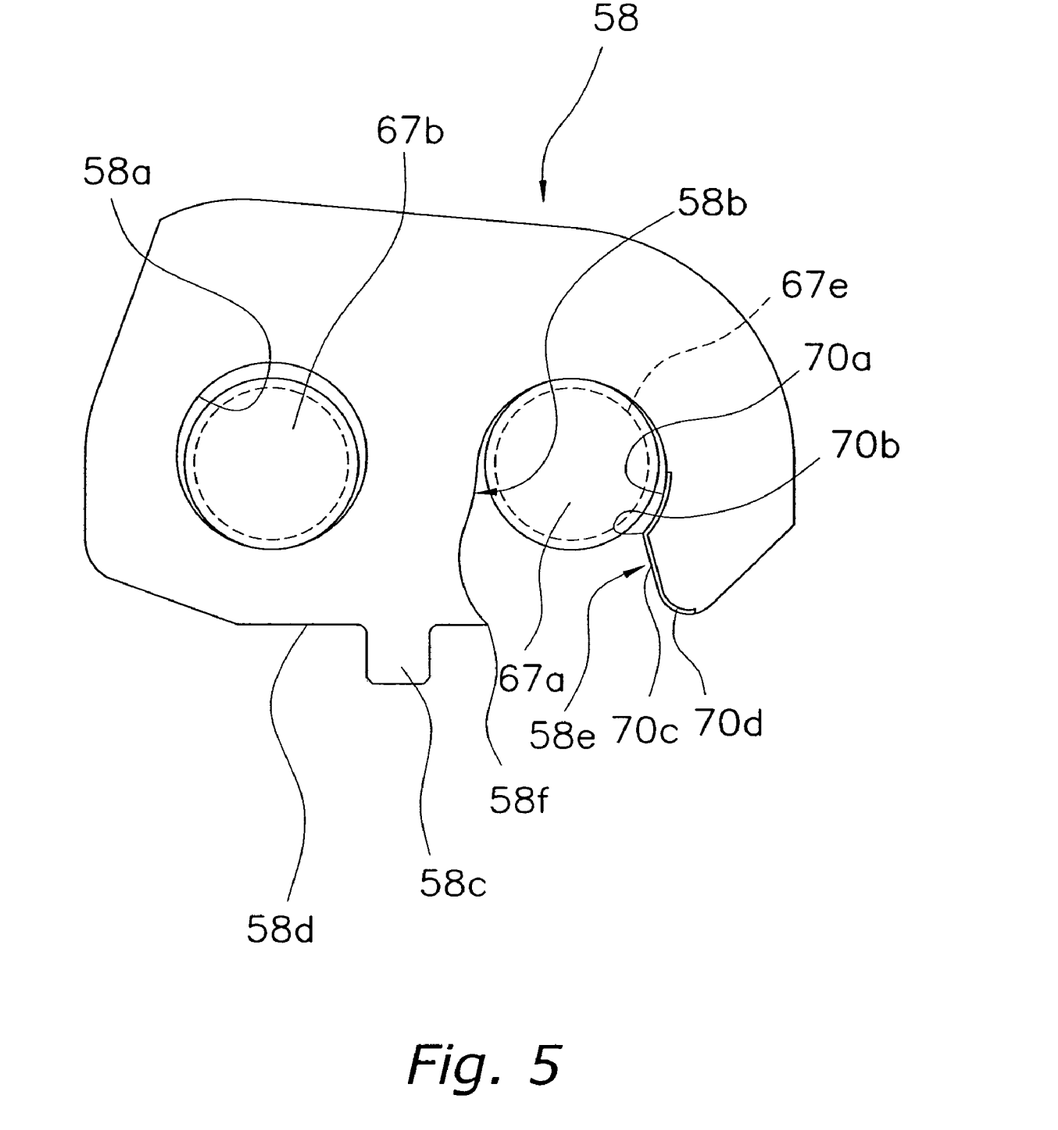
FIG. 5 is an enlarged elevational view of a retaining member used in the bicycle crank fixing structure in accordance with the first embodiment of the present invention.

The retaining member 58 is a plate-shaped member preferably made of metal such as stainless alloy or aluminum base alloy. As seen in FIG. 5, the retaining member 58 includes a mounting hole 58a through which the mounting bolt 67b passes, a engagement notch 58b that engages with the mounting bolt 67a and a retaining projection 58c that is formed and is projected to from the outer peripheral surface 58d between the mounting hole 58a and the engagement notch 58b. The mounting hole 58a is a hole that has a slightly larger inside diameter than the outside diameter of the mounting bolt 67b. The engagement notch 58b is circularly notched from the circumference surface side of the crank axle 54 toward the outside surface 58d so that the retaining member 58 can rotate about the mounting bolt 67b (the mounting bolt 67b as being a rotational center) in a state in which the mounting bolt 67a is mounted. The retaining member 58 includes a rotating cam surface 58e that is projected toward the mounting bolt 67a formed on the inner circumference surface of engagement notch 58b that is located farther from the mounting hole 58a. The rotating cam surface 58e is preferably arranged as a minute slope surface that is C-chamfered with a 45 degree in angle and is a cam surface that can be placed in contact with and passed through the screw groove 67e of the mounting bolt 67a. The rotating cam surface 58e includes a first arc part 70a that is formed in an arc shape from a position adjacent to the center of the mounting bolt 67a, a sharp point part 70b that is formed on an edge of the first arc part 70a, a linear part 70c that is formed in a slope in a direction to which the engagement notch 58b broadens from the sharp point part 70b and the second arc part 70d that links the linear part 70c and the side surface of the retaining member 58. In addition, a sharply projecting locking projection 58f is formed on a crossing part of the inside surface of the engagement notch 58b that is close to the mounting hole 58a and the outside surface 58d as seen in FIG. 5. The locking projection 58f is arranged to restrict the range of rotation in the direction that the retaining member 58 detaches from the retaining hole 57 and is formed to contact the outside surface of the mounting bolt 67a.

When the crank axle assembly 50 as described above is mounted to the hanger part 29, first, the bearings 63 and 64 and the cover members 65 and 66 are preliminary mounted to the right and left bearing housings 60 and 61. In addition, the connecting member 62 is mounted on one of the bearing housings 60 and 61. The bearing housings 60 and 61 are screwed to the female screw parts 29a and 29b of the hanger part 29 in this state. At this time, the right and left bearing housings 60 and 61 are screwed all the way with a prescribed torque for the bearing retaining sections 60a and 61a to have contact to edge surfaces of the hanger part 29.

Next, the right crank 51 to which the crank axle 54 is integrally coupled is inserted from the side of the bearing housing 61. Before mounting the left crank 52, the retaining member 58 is mounted on the slit 52d, and the mounting bolts 67a and 67b are mounted on the left crank 52 in a state in which they are loosely (partially) tightened. When mounting the left crank 52, the left crank 52 is mounted with a rotational phase that is 180 degrees apart from the right crank 51 on the left end portion of the crank axle 54 that is projected from the left bearing housing 60. Specifically, the left crank 52 is mounted on the crank axle 54 so that the recess and protrusion portions 52f and 54f face each other. When mounting the left crank 52 on the crank axle 54, as shown in a diagram (a) of FIG. 6, the retaining member 58 mounted on the slit 52d is turned such that the retaining projection 58c is located in a release position (i.e., disengaged from the retaining hole 57) so as not to interfere with the crank axle 54 and to enable the side of the engagement notch 58b to heave. If the retaining member 58 is rotated further, the locking projection 58f contacts the circumference surface of the mounting bolt 67a, and the range of rotation is restricted for the retaining member 58 not to separate further from the crank axle 54.

Then, the fastening bolt 59 is screwed to the female screw part 54a of the crank axle 54, and the left crank 52 is fixed onto the crank axle 54. The crank axle 54 moves toward left in FIG. 2 by tightening up the fastening bolt 59, and the inner edge surfaces 52c and 75a of the right and left cranks 52 and 51 place inward pressure on the inner rings 63a and 64a of the bearings 63 and 64 through the cover members 65 and 66. An adjustment to reduce misalignment between right and left of the crank axle 54 is performed by mounting the left crank 52 and adjusting the amount of pressure. The adjustment of the bearing play is completed when making adjustments to a state that has no misalignment and where smooth rotation of the crank axle 54 is achieved. When the adjustment of the bearing play is completed, the mounting bolts 67a and 67b of the left crank 52 are tightened up after the retaining member 58 is set as described below.

Figure 6:
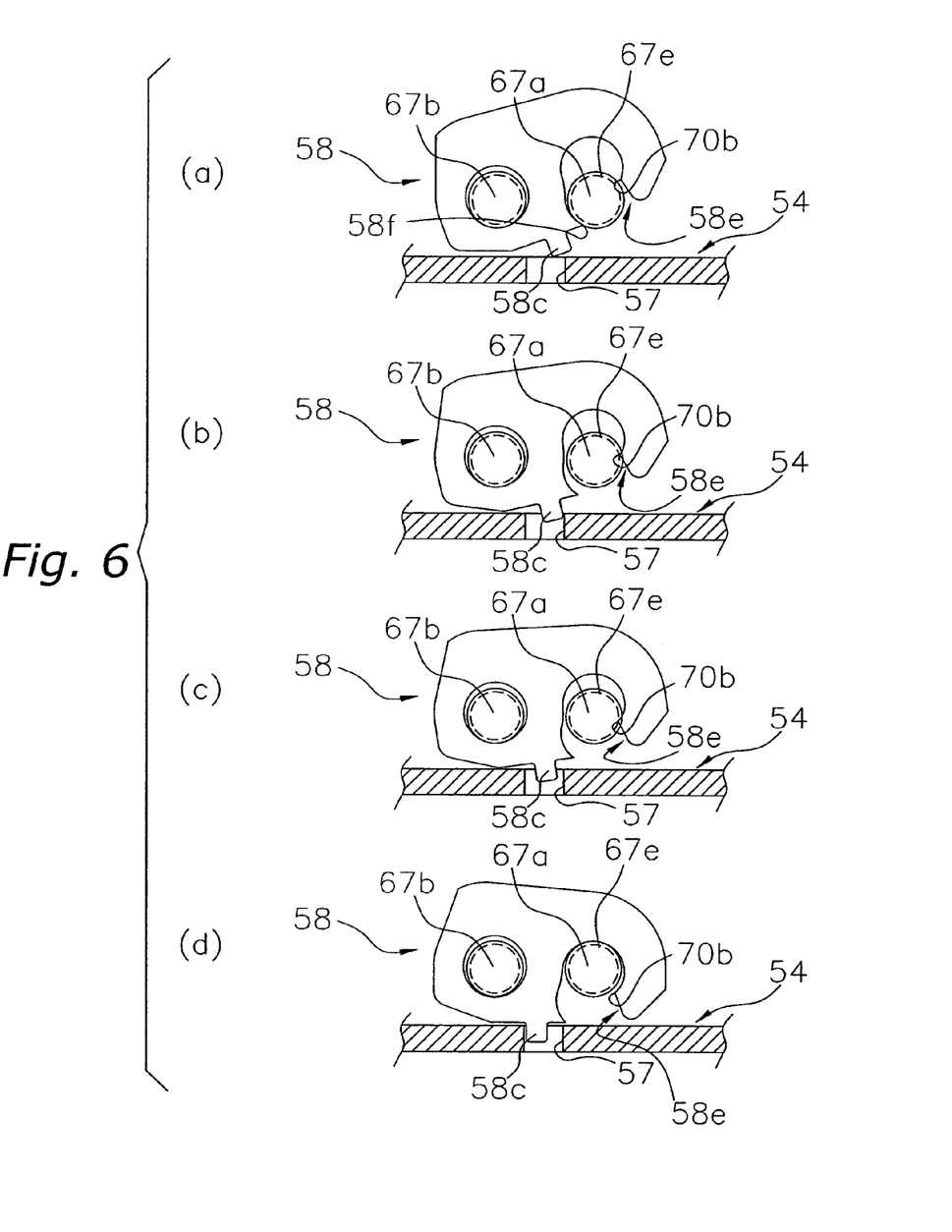
FIG. 6 is a series of diagrams illustrating a setting procedure of the retaining member in accordance with the first embodiment of the present invention.

In order to set the retaining member 58, first, as shown in a diagram (b) of FIG. 6, the rotating cam surface 58e is made in contact with the screw groove 67e of the mounting bolt 67a by pressing the heaved part of the retaining member 58. Since the mounting bolt 67a is inserted from the back side in FIG. 6 (the front side in FIG. 3) in the first embodiment, the mounting bolt 67a is slightly turn in the loosened direction (clockwise direction in FIG. 6) after the retaining member 58 is in contact with the mounting bolt 67a. Then, the screw groove 67e places pressure around the sharp point part 70b of the rotating cam surface 58e, and the retaining member 58 is rotated around the mounting bolt 67b in clockwise rotation in the direction that the retaining projection 58c approaches the retaining hole 57 to be locked in the retaining hole 57, as rotation of the mounting bolt 67a causes friction of the screw groove 67e of the mounting bolt 67a and the rotating cam surface 58e as shown in diagrams (c) and (d) of FIG. 6. Since the rotating cam surface 58e that has contact with the screw groove 67e of the mounting bolt 67a is provided in the retaining member 58, the retaining member 58 can be swung by rotation of the mounting bolt 67a such that the retaining projection 58c is located in an engagement position (i.e., engaged with the retaining hole 57).

When the retaining projection 58c is locked in the retaining hole 57, the mounting bolts 67a and 67b are fastened to strongly fix the left crank 52 to the crank axle 54. Accordingly, the bearing play will be hardly changed even if the fastening bolt 59 is loosened to some degree.

Since the retaining member 58 is disposed in the slit 52d, and the retaining projection 58c is locked in the retaining hole 57 formed in the crank axle 54, the left crank 52 will not drop off from the crank axle 54 even if the mounting bolts 67a and 67b are loosened in a state where the fastening bolt 59 has dropped off.

Second Embodiment

Figure 7:
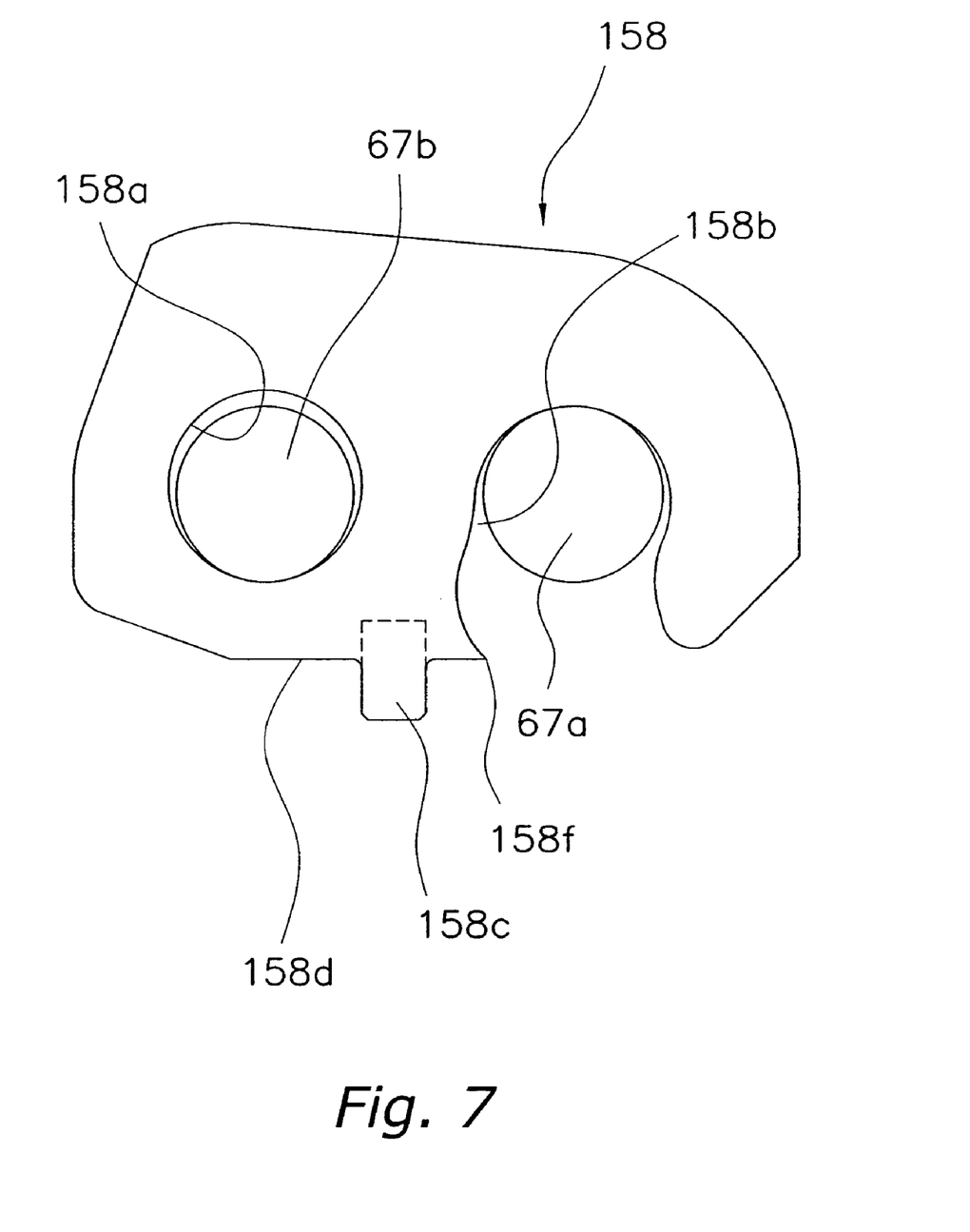
FIG. 7 is an enlarged elevational view of a retaining member used in a bicycle crank fixing structure in accordance with a second embodiment of the present invention.

Referring now to FIG. 7, a bicycle crank fixing structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The bicycle crank fixing structure of the second embodiment is basically identical to the bicycle crank fixing structure of the first embodiment except that a retaining member 158 used in the second embodiment is made of resin instead of metal as in the retaining member 58 used in the first embodiment.

As shown in FIG. 7, the retaining member 158 is preferably a plate-shaped member made of resin material that is relatively hard such as polyacetal resin or polyimide resin. The retaining member 158 includes a mounting hole 158a through which the mounting bolt 67b passes, an engagement notch 158b that engages with the mounting bolt 67a and a retaining projection 158c that is formed and projected from an outside surface 158d between the mounting hole 158a and the engagement notch 158b. The mounting hole 158a has a slightly larger inside diameter than the outside diameter of the mounting bolt 67b. The engagement notch 158b is circularly notched toward the circumference surface side of the crank axle 54 from the outside surface 158d so that the retaining member 158a can rotate about the mounting bolt 67b (the mounting bolt 67b is a center of rotation) in a state in which the mounting bolt 67a is mounted. The inside surface that is far from the mounting hole 158a of the engagement notch 158b has a curvature that is of a convexity after having a curvature that is concave as seen in FIG. 7. The projecting part of the engagement notch 158b that is the closest to the mounting bolt 67a has slight contact with the circumference surface of the mounting bolt 67a when the retaining member 159b rotates about the mounting bolt 67b direction. In addition, a sharply projecting locking projection 158f is formed between the inside surface that is close to the pass hole 158a of the engagement notch 158b and the outside surface 158d as seen in FIG. 7. The locking projection 158f is arranged to restrict the range of rotation in the direction that the retaining member 158 secedes from the retaining hole 157, and the locking projection 158f is formed to contact the outside surface of the mounting bolt 67a. The retaining projection 158c is preferably a metallic member. The retaining projection 158c is disposed on the outside surface 158d and integrally formed with other parts of the retaining member 158 by, for example, insert molding.

Accordingly, when the retaining member 158 is set to the crank axle fixing structure of the second embodiment, as well as the first embodiment, the retaining projection 158c is retained in the retaining hole 57 by pressing a heaved part of the retaining member 158 and overlapping a contact part with the mounting bolt 67a. When the retaining projection 158c is retained in the retaining hole 57, the mounting bolts 67a and 67b are tightened up, and the left crank 52 is strongly fixed onto the crank axle 54. Therefore, the bearing play is hardly changed even if the fastening bolt 59 is loosened to some degree.

In the above described embodiments, the bicycle crank fixing structure is described with the left crank 52 as an example. However, it will be apparent to those skilled in the art from this disclosure that the bicycle crank fixing structure of the present invention can be adapted to a right crank as long as the right crank includes a slit and a mounting bolt.

In the above described embodiments, the bicycle crank fixing structure for the road bike 10 is describe as an example. However, the crank fixing structure of the present invention can be adapted to all types of bicycles or electric bicycles such as an electric assist bicycle.

In the above described embodiments, the retaining member 58 or 158 and the mounting bolt 67a are arranged so that the retaining member 58 or 158 is rotated toward the engagement position by rotating the mounting bolt 67a in the loosening direction. However, it will be apparent to those skilled in the art from this disclosure that the retaining member 58 or 158 and the mounting bolt 67a can be arranged so that the retaining member 58 or 158 is rotated toward the engagement position by rotating the mounting bolt 67a in the tightening direction but it may be set for the turning direction of the retaining member to match the tightening direction by using a left screw as the mounting bolt 67a or setting the insertion direction of the mounting bolt 67a the opposite way.

In the above described embodiments, the right crank 51 is integrally coupled to the crank axle 54. However, the present invention can be adapted to a crank axle assembly where a right crank is linked to a crank axle by a bolt.

In the above described embodiments, the recess section of the crank axle 54 is arranged as the retaining hole 57 that penetrates the inner and outer circumference surfaces of the crank axle 54 because the crank axle 54 is formed as a pipe-shaped crank axle. However, the recess section of the crank axle may be any shape as long as the recess section is a shape that is caved in from the circumference surface of the crank axle and configured and arranged to retain the retaining projection of the retaining member. For example, the recess section of the crank axle may be a circular recess section or a circular groove.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank fixing structure comprising:
   a crank axle having a first axial end with a recess section formed on an outer circumferential surface thereof;
   a crank including a crank axle mounting section with a mounting bore non-rotatably coupled to the first axial end of the crank axle and a slit extending radially from the mounting bore, the crank being disposed with respect to the crank axle so that the slit of the crank is aligned with the recess section of the crank axle;
   a first screw member disposed in the crank axle mounting section of the crank so that the first screw member perpendicularly intersects with the slit of the crank to fasten the crank on the crank axle by adjusting a width of the slit; and
   a plate-shaped retaining member disposed in the slit of the crank, the retaining member having a retaining projection that is movable with respect to the crank between a release position in which the retaining projection is disengaged from the recess section and an engagement position in which the retaining projection is engaged from the recess section when the first screw member is partially tightened, the retaining projection engaging the recess section of the crank axle to prevent the crank from moving axially off of the first axial end of the crank axle when the retaining projection is in the engagement position and when the first screw member is partially tightened.

2. The bicycle crank fixing structure in accordance with claim 1, further comprising
   a fastening bolt screwed to a female screw section formed on the first axial end of the crank axle to fixedly couple the crank to the crank axle.

3. The bicycle crank fixing structure in accordance with claim 1, further comprising
   a second screw member disposed in the crank axle mounting section of the crank so that the second screw member perpendicularly intersects with the slit of the crank, the second screw member being spaced apart from the first screw member in an axial direction of the crank axle.

4. A bicycle crank fixing structure comprising:
   a crank axle having a first axial end with a recess section formed on an outer circumferential surface thereof;
   a crank including a crank axle mounting section with a mounting bore non-rotatably coupled to the first axial end of the crank axle and a slit extending radially from the mounting bore, the crank being disposed with respect to the crank axle so that the slit of the crank is aligned with the recess section of the crank axle;
   a first screw member disposed in the crank axle mounting section of the crank so that the first screw member perpendicularly intersects with the slit of the crank to fasten the crank on the crank axle by adjusting a width of the slit;

a second screw member disposed in the crank axle mounting section of the crank so that the second screw member perpendicularly intersects with the slit of the crank, the second screw member being spaced apart from the first screw member in an axial direction of the crank axle; and a plate-shaped retaining member disposed in the slit of the crank, the retaining member having a retaining projection that is retained in the recess section of the crank axle, the retaining member including a mounting hole through which the first screw member passes and an engagement notch that engages with the second screw member with the engagement notch being configured and arranged to allow rotation of the retaining member about the first screw member toward the outer circumferential surface of the crank axle.

5. The bicycle crank fixing structure in accordance with claim 4, wherein the retaining projection of the retaining member is disposed between the mounting hole and the engagement notch.

6. The bicycle crank fixing structure in accordance with claim 5, wherein the engagement notch of the retaining member includes a rotating cam surface configured and arranged to contact a screw groove of the second screw member so that the retaining member rotates in a direction that the retaining projection of the retaining member approaches the recess section of the crank axle in accordance with rotation of the second screw member.

7. The bicycle crank fixing structure in accordance with claim 4, wherein the first and second screw members include first and second head portions, respectively, that are disposed in opposite sides with respect to the slit of the crank.

8. The bicycle crank fixing structure in accordance with claim 7, wherein the retaining member is arranged such that the mounting hole is disposed inwardly with respect to the engagement notch in the axial direction of the crank axle.

9. The bicycle crank fixing structure in accordance with claim 1, wherein the retaining member is made of metal.

10. The bicycle crank fixing structure in accordance with claim 1, wherein the retaining member is made of resin.

11. The bicycle crank fixing structure in accordance with claim 10, wherein the retaining projection of the retaining member is made of metal and integrally formed with the retaining member.

12. The bicycle crank fixing structure in accordance with claim 2, further comprising a second screw member disposed in the crank axle mounting section of the crank so that the second screw member perpendicularly intersects with the slit of the crank, the second screw member being spaced apart from the first screw member in an axial direction of the crank axle.

13. A bicycle crank fixing structure comprising:

a crank axle having a first axial end with a recess section formed on an outer circumferential surface thereof;

a crank including a crank axle mounting section with a mounting bore non-rotatably coupled to the first axial end of the crank axle and a slit extending radially from the mounting bore, the crank being disposed with respect to the crank axle so that the slit of the crank is aligned with the recess section of the crank axle;

a first screw member disposed in the crank axle mounting section of the crank so that the first screw member perpendicularly intersects with the slit of the crank to fasten the crank on the crank axle by adjusting a width of the slit;

a second screw member disposed in the crank axle mounting section of the crank so that the second screw member perpendicularly intersects with the slit of the crank, the second screw member being spaced apart from the first screw member in an axial direction of the crank axle;

a fastening bolt screwed to a female screw section formed on the first axial end of the crank axle to fixedly couple the crank to the crank axle; and a plate-shaped retaining member disposed in the slit of the crank, the retaining member having a retaining projection that is retained in the recess section of the crank axle, the retaining member includes a mounting hole through which the first screw member passes and an engagement notch that engages with the second screw member with the engagement notch being configured and arranged to allow rotation of the retaining member about the first screw member toward the outer circumferential surface of the crank axle.

14. The bicycle crank fixing structure in accordance with claim 13, wherein the retaining projection of the retaining member is disposed between the mounting hole and the engagement notch.

15. The bicycle crank fixing structure in accordance with claim 14, wherein the engagement notch of the retaining member includes a rotating cam surface configured and arranged to contact a screw groove of the second screw member so that the retaining member rotates in a direction that the retaining projection of the retaining member approaches the recess section of the crank axle in accordance with rotation of the second screw member.

16. The bicycle crank fixing structure in accordance with claim 13, wherein the first and second screw members include first and second head portions, respectively, that are disposed in opposite sides with respect to the slit of the crank.

17. The bicycle crank fixing structure in accordance with claim 16, wherein the retaining member is arranged such that the mounting hole is disposed inwardly with respect to the engagement notch in the axial direction of the crank axle.

* * * * *